US000001965H

(19) United States

(12) Statutory Invention Registration

Burns et al.

(10) Reg. No.: US H1965 H

(43) Published: Jun. 5, 2001

(54) COMPACT CONTINUOUS WAVE TUNABLE INFRARED LASERS AND METHOD THEREFOR

(76) Inventors: William K. Burns, 1212 Priscilla La., Alexandria, VA (US) 22308; Lew Goldberg, 3316 Midland Rd., Fairfax, VA (US) 22031; Wayne McElhanon, 2901 Edgewood Rd., Bryans Rd., MD (US) 20616

(21) Appl. No.: 08/714,876

(22) Filed: Sep. 17, 1996

(51) Int. Cl.[7] ..... H01S 3/10

(52) U.S. Cl. ..... 372/22

*Primary Examiner*—Daniel T. Pihulic

(57) ABSTRACT

A bulk, quasi-periodic phase-matched difference-frequency (DFG) process in field-poled $LiNbO_3$ bulk crystal permits continuous tunability of the output radiation in the 3.0–4.1 $\mu$m wavelength range through grating rotation. DFG in QPM-$LiNbO_3$ crystal, carried out using a Nd:YAG laser and a high power semiconductor laser at the quasi-phased matching (QPM) degeneracy point, results in an ultra wide 0.5 $\mu$m acceptance bandwidth, permitting crystal rotation-free wavelength tuning of 4.0–4.5 $\mu$m, with 0.2 mW output power at 4.5 $\mu$m.

11 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPACT CONTINUOUS WAVE TUNABLE INFRARED LASERS AND METHOD THEREFOR

BACKGROUND OF THE INVENTION

1. Field of the Invention

The present invention relates generally to mid-range infrared (IR) laser sources. More specifically, the present invention relates to mid-range IR laser sources produced by difference-frequency generating (DFG) optical circuits using bulk crystals.

2. Description of the Background Art

Mid-range IR (2–4 $\mu$m) sources are of interest in the field of spectroscopy, pollution monitoring, electronic warfare (EW) applications, etc. Adequate sources in this wavelength range generally do not exist. Filament, or black body emitters, have low, uncollimated power and provide poor spectral resolution. Semiconductor laser sources require low temperature operation and have limited tunability.

Tunable laser-like sources are generally obtained from optical parametric oscillators (OPO's), which have been available for some time. However these usually have kilowatt power thresholds, which require complicated Q-switched lasers. Often, these lasers must be water cooled. OPO's are usually thermally tuned, often up to 180 degrees C; thus tuning is slow. OPO's are generally considered laboratory setups, as opposed to portable instruments.

Difference frequency generation (DFG), i.e., the subtraction of photons from two laser inputs, has also been used for IR generation. Such nonlinear processes must be phase matched for efficient conversion. It will be appreciated that birefringence phase matching in birefringent crystals is typically used. Characteristic outputs have been low ($\approx$50 $\mu$W) and these outputs not widely tunable due primarily to limitations of bifringence phase matching.

U.S. Pat. No. 5,434,700 discloses an optical wavelength converter formed from semiconductor materials. This patent also discusses a number of other publications which are cited therein, including a reference by Hermann et al., which discusses the use of a lithium niobate material for difference-frequency generation of tunable, mid-infrared radiation, and the Lim et al. reference, which allegedly discloses the use of a periodically poled lithium niobate waveguide for generating infrared radiation by quasi-phase-matched, difference-frequency mixing.

U.S. Pat. No. 5,412,502 discloses a quasi-phase-matching second harmonic generating optical element. Although this patent is directed to second harmonic generation, as opposed to difference-frequency generation, it will be appreciated that such non-linear ferroelectric optical elements can be used for both applications. In particular, this patent discloses a non-linear ferroelectric optical element, which may be lithium niobate, that is periodically poled, and notes that "inclining the substrate allows the wavelength to be adjusted" to compensate for the dispersion of the semiconductor laser.

U.S. Pat. No. 5,504,616 discloses a wavelength conversion device formed by adding a laser-active material to a non-linear optical crystal. In the Background section, it is noted that the same type of nonlinear optical crystals as are used for second harmonic generation can be used for difference-frequency generation when two different wavelengths are input to the crystal.

U.S. Pat. No. 5,506,722 discloses an optical wavelength converting device utilizing a non-linear periodically poled optical device. Of particular interest is the disclosure of the electromagnetic domains formed in the crystal being rotated relative to the crystal faces.

U.S. Pat. No. 5,058,970 discloses a quasi-phase matching optical waveguide. As discussed therein with reference to FIG. 6, where the width and spacing of the electromagnetic domains are respectively uniform, the substrate may be rotated in order to lengthen or shorten the optical path, while still providing efficient generation of a second harmonic output.

It will be appreciated that these patents are generally directed to low power optical waveguide devices not suited to the output power requirements of many industrial and military applications.

SUMMARY OF THE INVENTION

The principal purpose of the present invention is to overcome the express and implicit limitations of the previously developed mid-range IR generators.

An object according to the present invention is to produce a laser system applying a difference-frequency generation (DFG) process which provides a narrow bandwidth resultant output responsive to fixed and variable inputs. According to one aspect of the invention, a bulk, quasi-periodic phase-matched difference-frequency generation (DFG) process in field-poled $LiNbO_3$ bulk crystal permits continuous tunability of the output radiation in the 3.0–4.1 $\mu$m wavelength range through grating rotation.

Another object according to the present invention is to provide a laser system applying a difference-frequency generation (DFG) process which provides a broad bandwidth resultant output responsive to fixed and variable inputs.

According to another aspect of the present invention, DFG in QPM-$LiNbO_3$ carried out using a Nd:YAG laser and a high power semi-conductor laser at the quasi-phased matched (QPM) degeneracy point results in an ultra wide 0.5 $\mu$m acceptance bandwidth, permitting crystal rotation-free wavelength tuning of 4.0–4.5 $\mu$m, with 0.2 mW output power at 4.5 $\mu$m.

These and other objects, features and advantages according to the present invention are provided by a combination generating a resultant laser beam of desired wavelength. Preferably, the combination includes a first laser device generating a first beam of adjustable wavelength, a second laser device generating a second beam of fixed wavelength, a periodically poled non-linear crystal receiving the first and second beams at one face of the crystal and a rotating mechanism for rotating the crystal so as to control the angle of incidence of the first and second beams with respect to the face of the crystal so as to permit the first and the second beams to combine and thereby form the resultant beam.

These and other objects, features and advantages according to the present invention are provided by a combination generating a resultant laser beam in a desired wavelength range. Preferably, the combination includes a first laser device generating a first beam of adjustable wavelength, a second laser device generating a second beam of fixed wavelength, and a periodically poled non-linear crystal receiving the first and second beams at one face of the crystal, wherein the period of the crystal is substantially equal to but less than the degeneracy point for the crystal, the crystal combining the first and the second beams to thereby form the resultant beam in the desired frequency range.

These and other objects, features and advantages of the invention are disclosed in or will be apparent from the following description of preferred embodiments.

BRIEF DESCRIPTION OF THE DRAWINGS

The preferred embodiments are described with reference to the drawings in which like elements are denoted by like or similar numbers and in which.

DESCRIPTION OF THE PREFERRED EMBODIMENTS

Coherent optical sources are required throughout the 2–5 $\mu$m mid-IR wavelength range for a wide range of industrial applications, e.g., fiber-optic chemical sensors, biomedical technology, chemical analysis, high-resolution spectroscopy, industrial process monitoring, and atmospheric and environmental sensing. Although laser diodes are available at some of the wavelengths of interest, laser diodes require low-temperature operation and exhibit poor spectral characteristics, with narrow discontinuous tuning ranges. Desirable mid-IR source characteristics include compactness, high efficiency, narrow linewidth, and wide, continuous, and rapid tunability. Sources based on difference-frequency generation (DFG) advantageously can meet all of these requirements if near-IR laser diodes are used as pump sources. It will be appreciated that, in one implementation, a 50 -$\mu$W output was generated at 4.3 $\mu$m by the mixing of the emission of a Ti:$Al_2O_3$ laser and the emission of a high-power semiconductor amplifier in $AgGaS_2$. Significant increases in DFG power were also achieved by intracavity mixing in a Nd:YAG laser.

Although appropriate nonlinear materials for carrying out DFG in the 2–5 $\mu$m range are available, the alternative use of quasi-phase matching (QPM) in $LiNbO_3$ has only recently been investigated. It will be appreciated that the advantages of QPM in $LiNbO_3$ are its high nonlinear coefficient $d_{33}$, zero walk-off angle, low material costs and large available crystal sizes, good transparency at pump wavelengths, and well-established fabrication techniques for waveguides, which features are all required for high conversion efficiencies with low-power laser-diode pumps. DFG by use of Nd:YAG and Ti:$Al_2O_3$ lasers and a periodically surface-poled $LiNbO_3$ waveguide has been demonstrated and produced 1.8 $\mu$W of output power at 2.1 $\mu$m.

In addition to surface poling, which is appropriate for waveguide frequency conversion, bulk periodic poling advantageously can be used when much greater power-handling capabilities are required. Bulk QPM frequency-conversion processes were recently demonstrated in $LiNbO_3$ for use in second-harmonic generation of, for example, blue light, and for a 1.7–3.0 $\mu$m optical parametric oscillator pumped by a Q-switched Nd:YAG laser and a laser diode. Bulk poling has also been demonstrated in KTP.

However, a widely tunable DFG in bulk periodically field-poled $LiNbO_3$ has not been previously reported or achieved. Using grating rotation to alter the effective grating period, the emission wavelength advantageously can be varied from 3.0 to 4.1 $\mu$m by nonlinear mixing of Nd:YAG and tunable Ti:$Al_2O_3$ emissions in a 245 $\mu$m thick 6 mm long bulk crystal. As discussed in greater detail below, a maximum DFG output power of 0.5 mW was measured for an optical circuit according to a preferred embodiment of the present invention shown in FIG. 1.

Figure 1:
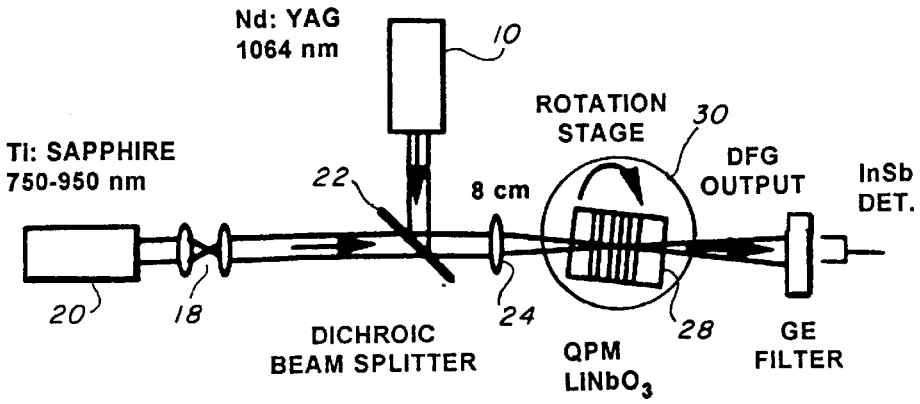
FIG. 1 is a schematic diagram illustrating a preferred embodiment of a narrowband difference-frequency generating (DFG) optical circuit according to the present invention.
Figure 2:
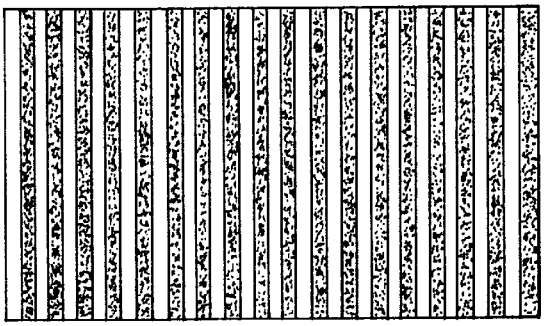
FIG. 2 is a photographic illustration of the etched domain pattern of a bulk crystal which can be employed in the optical circuit of FIG. 1.

Referring to FIG. 1, the optical circuit, i.e., the DFG device, includes a rotatable crystal 28, which advantageously can be a z-cut $LiNbO_3$ bulk crystal having a metal ground plane electrode on the −c side and a patterned electrode on the +c side. It will be noted that the bulk crystal was field poled using, in an exemplary case, 5.8-kV 500 $\mu$s-long pulses. Gratings with periods of $\Lambda$=21.2, 22.6, 23.2 $\mu$m, calculated for phase matching at pump wavelengths $\lambda_3$=787, 816, 840 nm, and DFG wavelengths $\lambda_1$3.0, 3.5, and 4.0 $\mu$m, respectively, were tested using the optical circuit configuration illustrated in FIG. 1. It will be noted that the device for rotating the bulk crystal advantageously can be any number of suitable electromechanical or mechanical devices such as a turntable 30. An example of the etched grating pattern is shown in FIG. 2.

DFG was achieved in the optical circuit of FIG. 1 by superimposing the $\lambda_2$=1064 nm emission from a Nd:YAG laser 10 and a tunable Ti:$Al_2O_3$ laser 20, using a dichroic beam splitter 22, as shown in FIG. 1. The lamp-pumped cw Nd:YAG laser 10 delivered as much as 4 W of power to the nonlinear crystal 28. This power level is comparable with that obtainable from commercially available diode-pumped Nd:YAG lasers. Similarly, the maximum 426 mW of incident Ti:$Al_2O_3$ power used is below that generated by recently developed large-active-area GaAs semiconductor amplifiers. A telescope 18 in the Ti:$Al_2O_3$ beam was used to superimpose beam waists longitudinally and to equalize diameters of the two laser beams. Combined beams were focused into the QPM sample by an f=8 cm lens 24. A Gaussian beam waist of $\omega_0$=27 $\mu$m was produced for the 1064 -nm beam in the horizontal and vertical planes, while beam waists of $\omega_{0x}$=20 $\mu$m and $\omega_{0y}$=35 $\mu$m were produced in the two planes for the elliptically shaped Ti:$Al_2O_3$ beam. These focusing conditions were experimentally found to maximize the DFG power.

The output power for the DFG process of $\omega_1=\omega_3-\omega_2$ is given by $$P_1 = \frac{4\omega_1^2 k_2 k_3 d_{eff}^2}{\pi\varepsilon_0(k_2+k_3)n_1 n_2 n_3 c^3} h(\mu, \xi) L P_2 P_3 \tag{1}$$

where $k_1$, $k_2$, and $k_3$ are the wave vectors at the three interacting wavelengths and $h(\mu, \xi)$ is the focusing parameter, which is a function of $\mu=k_2/k_3$ and the ratio $\xi=L/b$ of the interaction length L to the confocal parameter b. It should be mentioned that equation (1) applies when the confocal parameters of the two input beams are equal. For the exemplary case under discussion, $b=2\pi\omega_{02}n/\lambda=9.5$ mm at 1064 nm and b=13 mm at 787 nm, given a mean Gaussian waist $\omega_0=(\omega_{0x}+\omega_{0y})/2=27.5$ $\mu$m for the Ti:$Al_2O_3$ beam. Approximating the confocal parameter for the two input beams by a mean value of $b_a=11$ mm, corresponding to $\xi=0.55$, a focusing parameter value of $h(\mu, \xi)\approx 0.26$ can be estimated using $\mu=0.74$ and plots shown in the article by P. Canarelli et al. which was published in the Journal of the Optical Society of America at Vol. B 9, page 197 (1992), which reference is incorporated herein by reference for all purposes. It will be appreciated that this is only slightly smaller than the maximum value of $h\approx 0.3$ predicted for optimum focusing corresponding to $\xi\approx 1.3$.

It should also be mentioned that, using Millers delta value corresponding to a nonlinear coefficient of $d_{33}=27$ pm/V measured for 1064 nm frequency doubling, a nonlinear coefficient of $d_{33}=24$ pm/V for DFG at $\lambda_1=3.0$ $\mu$m, which corresponds to an effective nonlinear coefficient of $d_{eff}=2d_{33}/\pi=15$ pm/V for the QPM process, can be calculated. For interaction length L=6 mm and $P_2P_3=1$ $W^2$, Eq. (1) predicts that $P_1=0.61$ mW, which corresponds to a length—normalized slope efficiency of $\eta=1.0$ mW/(CM $W^2$) [0.10%/(W cm)]. After correction for reflective losses at the input and output facets, a slope efficiency of 0.65 mW/(cm $W^2$) is predicted for the exemplary case under discussion.

Figure 3:
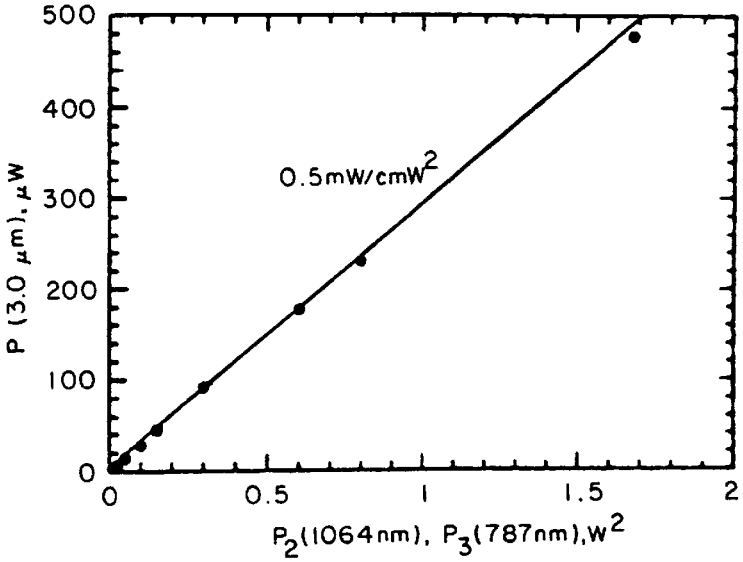
FIG. 3 is a graph showing output power with respect to the product of the input lasers for the optical circuit shown in FIG. 1.

Measured values of DFG power at 3.0 $\mu$m generated in a $\Lambda=21.2$ $\mu$m grating are plotted as a function of the input power product $P_2P_3$ in FIG. 3. It should be mentioned that the first five data points were derived at a fixed $P_2=1.0$ W, whereas all other points, except for the last data point, were taken with $P_2=2.0$ W. A maximum of $P_1=450$ $\mu$W was measured at $P_2=4.0$ W, $P_3=0.42$ W. The DFG power versus $P_2P_3$ dependence was linear, with a length—normalized slope efficiency of $\eta=048$ mW/(cm $W^2$). It will be appreciated that this is in good agreement with the value calculated using Eq. (1), particularly in view of the elliptical shape of the $\lambda_3$ beam. The close-to-theoretical DFG power is evidence of the near-ideal geometry of the fabricated QPM grating. Similar results were obtained at $\lambda_1=3.5$ $\mu$m in the $\Lambda=22.6$ $\mu$m grating. Grating quality was further verified when, in a different experimental arrangement (not illustrated), the phase-matching bandwidth for the $\Lambda=21.2$ $\mu$m grating was measured to be 1.2 nm full-width half-maximum (FWHM) beam width, which is substantially equal to that calculated for a 6.0 mm interaction length.

Figure 4:
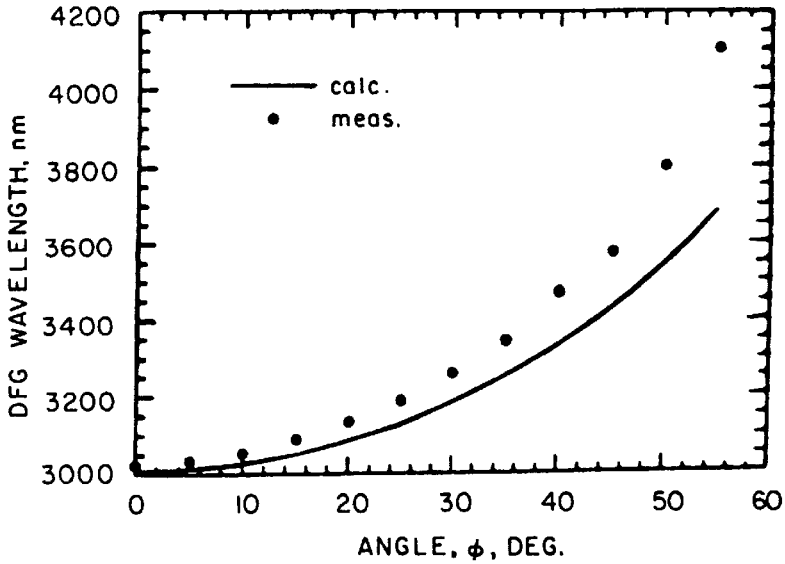
FIG. 4 is a graph illustrating the relationship between output wavelength and rotation angle for the optical circuit of FIG. 1.

Using the optical circuit illustrated in FIG. 1, the DFG wavelength was varied by tuning the Ti:$Al_2O_3$ laser and rotating the bulk crystal 28, to thereby change the input beam incidence angle $\theta$ and the effective grating period. As shown in FIG. 4, continuous wavelength coverage extended from 3.0 $\mu$m at $\theta=0°$ and $\lambda_3=787$ nm to 4.1 $\mu$m at $\theta=55°$ and $\lambda_3=844$ nm. For comparison, angle-tuning characteristics calculated by use of published Sellmeier coefficients are also shown.

Figure 5:
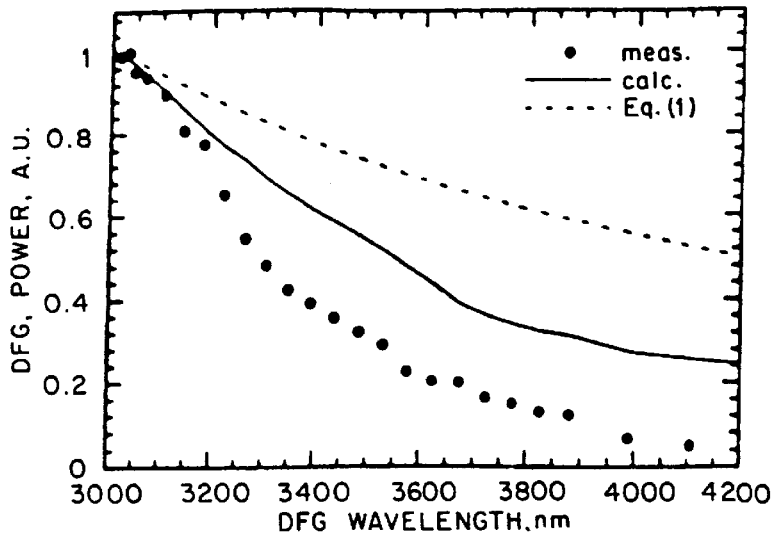
FIG. 5 is a graph depicting DFG power with respect to wavelength for the optical circuit of FIG. 1.
Figure 6:
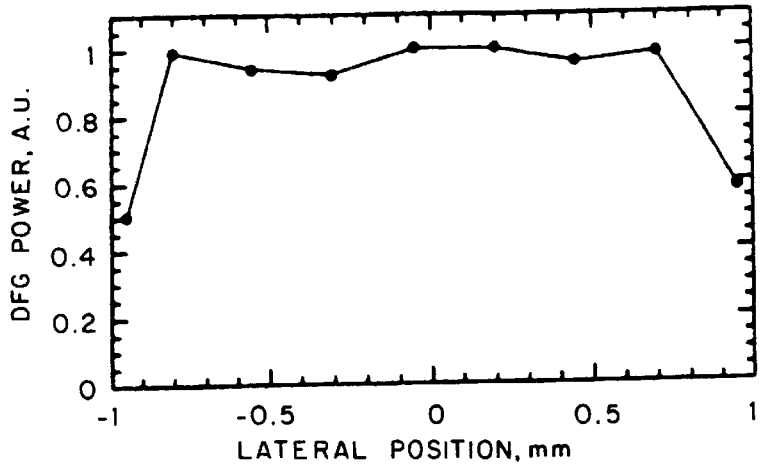
FIG. 6 is a graph showing DFG power with respect to lateral position in the optical circuit of FIG. 1.

Measured and calculated variations of the relative DFG output power with the DFG wavelength are shown in FIG. 5, wherein the dashed curve represents the wavelength dependence of Eq. (1) with the wave length dependence of the refractive index and h being neglected. In FIG. 5, the solid curve represents the combined effects of the wavelength dependence of Eq. (1) and variations of facet reflectivity and beam path length inside the active region with $\theta$. Although there is good agreement between the measurement and calculation for $\lambda_1\leqq 3.2$ $\mu$m ($\theta\leqq 26°$), a more-rapid-than-predicted falloff in $P_1$ occurs at the longer wavelengths. Apparently, this rapid falloff is primarily due to a reduction of the acceptance angle and partially due to an increased pump beam ellipticity and astigmatism at large incidence angles. At normal incidence (($\theta=0°$) the calculated half-acceptance angle (defined as the interior angle at which $P_1$ is down by 3 dB) of $\theta_a=3.2°$ is in good agreement with the measured value of $\theta_a=3.5°$. It should be noted that at large values of $\theta$, the acceptance angle is significantly reduced owing to a more rapid change of the effective grating period with increasing $\theta$. For example, at $\theta=50°$ (21° inside the bulk crystal) it is estimated that $\theta=0.25°$, which is less than the 0.32° full-divergence angle ($1/e^2$ power points) of a $\lambda=787$ nm Gaussian beam with $\omega_{0x}=20$ $\mu$m. A less rapid falloff in $P_1$ versus $\lambda_1$ dependence advantageously may be achieved by increasing the input beam waists to reduce beam divergence. In addition, the power drop that is due to increased facet reflectivity and beam ellipticity at large $\theta$ advantageously can be reduced by polishing the facets of the bulk crystal 28 at an offset angle relative to the grating, so that achieving the maximum effective grating period for generation of 4.1 $\mu$m output would require a smaller incidence angle. It should also be noted that good uniformity of the QPM region was verified by measuring $P_1$ at $\theta=0°$ while translating the bulk crystal 28 in the lateral direction. The results, which are shown in FIG. 6, exhibit a less than 10% power variation across the entire 2-mm active-region width, indicating a less than 5% variation in $d_{eff}$.

As discussed above, coherent 2–5 $\mu$m mid-IR sources are required for applications such as fiberoptic chemical sensors, spectroscopy, industrial process monitoring atmospheric and environmental monitoring. It will be appreciated that the required source characteristics include narrow spectral width (100 MHz is typically desirable), room temperature operation, compactness, high efficiency, wide and continuous tuning. These requirements cannot be directly met by typical semiconductor lasers, but can be satisfied by difference frequency generation (DFG) using semiconductor lasers or diode pumped solid state lasers. Compared with tunable optical parametric oscillators (OPO), DFG process devices have no oscillation threshold and therefore can produce a continuous wave (cw) using available laser diodes or diode pumped solid state lasers, generate narrowband emission, and have a simple optical configuration.

Although birefringently phasematched nonlinear materials for 2–5 $\mu$m DFG are available, the alternative use of quasi phasematching (QPM) in $LiNbO_3$ offers advantages of high nonlinear coefficient $d_{33}$, noncritical phasematching with zero walk-off, low material costs, and good transparency at pump wavelengths. Bulk poled QPM-$LiNbO_3$ can be used to generate 0.5 mW at 3.0 $\mu$m by DFG of Ti:$Al_2O_3$ and Nd:YAG laser, as disclosed immediately above, and in OPO's pumped by a high power Nd:YAG amplifiers and laser diodes. Alternatively, a practical mid-IR DFG source can be provided using a high power, external cavity semiconductor laser and a Nd:YAG laser, as discussed immediately below.

QPM $LiNbO_3$ exhibits an ultra-wide phasematching bandwidth of approximately 500 nm when operated at the wavelength vs. effective domain period degeneracy point. This unique property is absent in conventional, birefringently phasematched materials where typical phasematching bandwidths are more than two orders of magnitude smaller. The wide acceptance bandwidth allows single knob wavelength tuning from 4–4.5 $\mu$m by varying the wavelength of one of the mixing sources, without requiring adjustments of the QPM crystal angle. A maximum of 0.2 mW was generated at 4.5 $\mu$m, which power is significantly higher than that generated by previous laser diode and solid state laser pumped DFG devices.

It should be noted that a DFG wavelength coverage of $\lambda_1$=3.0–5.5 $\mu$m can be demonstrated using a Ti:$AL_2O_3$ laser in a single QPM crystal using angle tuning.

Figure 7:
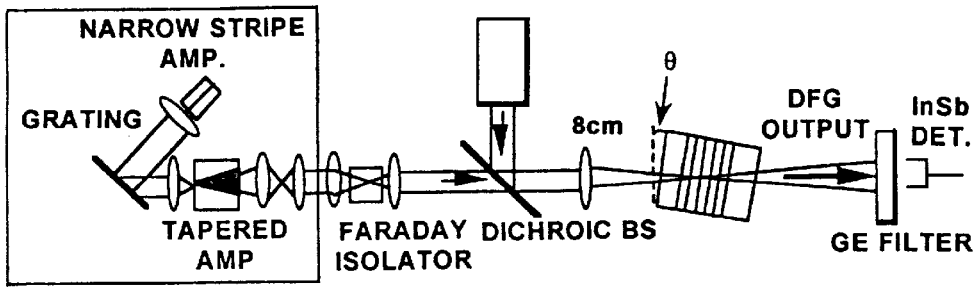
FIG. 7 is a schematic diagram illustrating another preferred embodiment for a narrowband DFG optical circuit according to the present invention.

FIG. 7 shows a DFG optical circuit according to another preferred embodiment of the present invention, including first and second output lasers 110, 120. Preferably, $\lambda_2$=1064 nm laser emission from a first, Nd:YAG laser source 110, is combined with that of a cw external cavity semiconductor laser 120 using a dichroic beam splitter 122. Advantageously, the laser 120 can be a tapered GaAlAs amplifier-external cavity laser, although other laser sources are also usable. More specifically, the compound external cavity of the semiconductor laser may contain a GaAlAs tapered stripe amplifier 112 with a 130 $\mu$m output aperture and a peak gain near 855 nm, a diffraction grating 114 for tuning, and a single stripe semiconductor amplifier 116. It will be appreciated that although a diffraction grating alone can be used to provide optical feedback required to achieve laser actions, the narrow stripe amplifier 116 lowers the lasing threshold while increasing output power available. The laser threshold occurs at a tapered amplifier current of I=1.1 A, and the output power (exiting the amplifier) is 820 mW at I=2.0 A, with 0.5 W transmitted to the QPM bulk crystal. As noted in FIG. 7, the output of laser 110 is provided to beam splitter 122 via a Faraday isolator 126.

Referring again to FIG. 7, the pump beams are focused by a f=8 cm lens 124, producing a 29 $\mu$m FWHM beam waist ($\omega_0$=25 $\mu$m) at the center of a 245 $\mu$m thick, 6 mm long, bulk field poled QPM $LiNbO_3$ crystal 128. The z cut crystals, with a patterned electrode on the +c side, preferably are field poled using 5.8 kV, 500 $\mu$sec pulses. It should be mentioned that samples with QPM domain periods of $\Lambda$=22.6 and 21.2 $\mu$m, designed for phasematching at $\lambda_1$=3.5 $\mu$m and $\lambda_1$=3.0 $\mu$m, respectively, were used in the optical circuit of FIG. 7.

Figure 8:
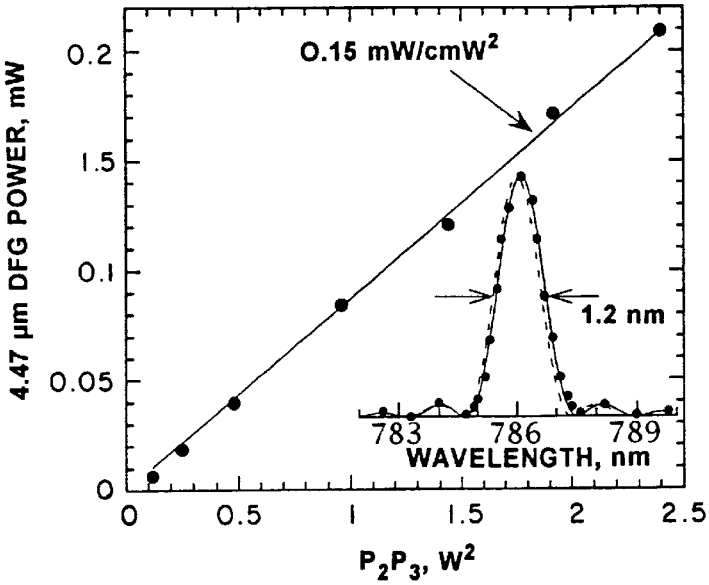
FIG. 8 is a graph illustrating DFG power with respect to pump power product for the optical circuit of FIG. 7, wherein the included insert illustrates actual and theoretical phasematching bandwidths for a selected grating.

DFG power at $\lambda_1$=4,.47 $\mu$m, generated by tuning the semiconductor laser to $\lambda_3$+859.4 nm, is shown as a function of the pump power product $P_2P_3$ in FIG. 8, where $P_3$=0.48 W and the Nd:YAG power $P_2$ was varied. For phasematching, the effective QPM period $\Lambda_e$ advantageously can be changed by rotating a $\Lambda$=22.6 $\mu$n samples by $\theta$=18° ($\theta_1$=8.2° internal angle) in the x-y plane, relative to the facet normal, resulting in an effective period of $\Lambda_e=\Lambda/\cos\theta_i$=22.8 $\mu$m. It should be noted that a maximum of 0.2 mW was generated by the optical circuit of FIG. 7 for $P_2$=5.0 W with a normalized nonlinear conversion efficiency of 0.015%/W cm. The theoretical efficiency was calculated using $d_{33}$=22 pm/V, obtained from Miller's delta rule and $d_{33}$=27 pm/V for 1064 nm second harmonic generation (SHG). For the focusing conditions associated with the optical circuit of FIG. 7, corresponding to an average confocal parameter $b=2\pi\omega_0 n/\lambda$=8.7 mm ($2\lambda=\lambda_2+\lambda_3$) an estimated Boyd & Kleinman focusing parameter of h=0.28 is obtained, yielding an efficiency of 0.022%/W cm. Accounting for facet reflective losses, this predicts an efficiency of 0.014%/W cm, which is in agreement with actually measured values. It should also be noted that a quality output was verified by measuring the phasematching bandwidth, shown for a $\Lambda$=21.2 grating, which grating was designed for phasematching at $\lambda_1$=786 nm, $\lambda_1$=3.0 $\mu$m, as illustrated in the insert of FIG. 8. The 1.2 nm FWHM of the $\text{sinc}^2$ dependence equals that calculated using published Sellmeier coefficients.

Figure 9:
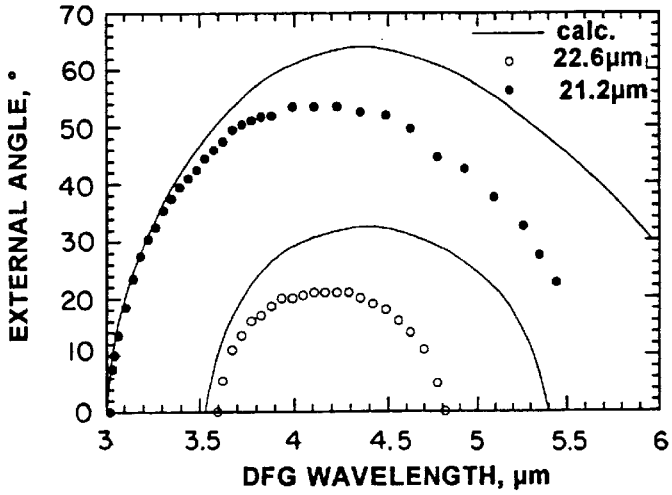
FIG. 9 is a graph illustrating the output DFG wavelength with respect to the external angle of the bulk crystal for the optical circuit of FIG. 7.

Phasematching wavelength versus $\theta$ dependence, measured using a Ti:$Al_2O_3$ laser, is shown in FIG. 9 for two grating periods. Also shown is the calculated dependence, where the discrepancy at longer wavelengths is attributed to inaccuracies in the Sellmeier coeffients. A special condition of $d\theta/d\lambda$, which is equivalent to $d\Lambda_e/d\lambda=0$, occurs at the degeneracy point of $\theta$=21°, $\lambda_1$=4.2 $\mu$m for the 22.6 $\mu$m grating. It should be noted that this important property is a consequence of the fact that the $n(\lambda)$ dependence has a minimum slope at ≈2.0 $\mu$m, and for DFG at $\lambda_1$≈4.2 $\mu$m, $\lambda_3$≈0.85 $\mu$m the phasematching condition $1/\Lambda=n_3/\lambda_3-n_2/\lambda_2-n_1/\lambda_1$ can be maintained over a large wavelength range because the values of $dn(\lambda)/d\lambda$ near $\lambda_1$ and $\lambda_3$ are such that $n_3/\lambda_3-n_1/\lambda_1$ remains relatively constant as $\lambda_3$ changes. The degeneracy condition $d\Lambda_e/d\lambda=0$ can be moved to other $\lambda_1$ wavelengths by choosing a different $\lambda_2$ pump wavelength.

Figure 10:
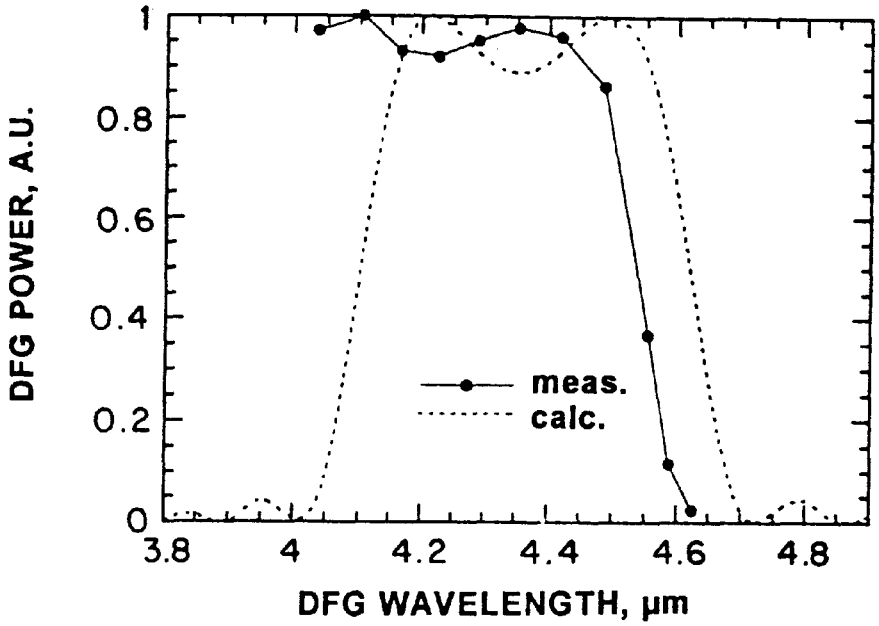
FIG. 10 is a graph illustrating DFG output power with respect to output (difference) wavelength for the optical circuit for a typical fixed pump beam DFG apparatus.

The ultra-wide phasematching bandwidth near the $d\Lambda_e/d\lambda=0$ point advantageously allows simple one knob DFG wavelength tuning by varying $\lambda_3$ only, with no sample rotation required. FIG. 10 shows the fixed-angle tuning range which can be achieved by varying $\lambda_3$ from 842 nm to 865 nm. The phasematching bandwidth, centered at $\lambda_1$=4.2 $\mu$m, is 0.5 $\mu$m FWHM. By way of comparison, the theoretical dependence is also shown. It should be noted that in order to get good agreement with the measured bandwidth, a QPM period of $\Lambda$=23.3 $\mu$m was assumed. It should also be noted that discrepancies between the actual and theoretical values are attributed to inaccuracies in the Sellmeier coefficients coupled with the fact that the minimum value of $\lambda_1$ was determined with a 842 nm laser tuning limit.

Figure 11:
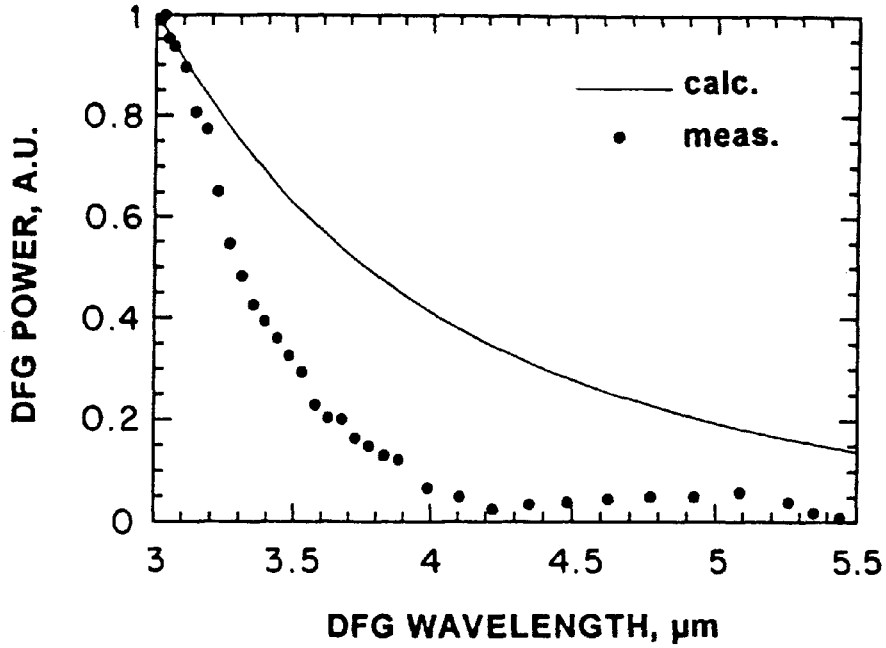
FIG. 11 is a graph illustrating DFG output power with respect to DFG output wavelength for the optical circuit of FIG. 7.

In addition to rotation free operation near the degeneracy point, the wavelength coverage advantageously can be further extended by sample rotation. As shown in FIG. 9, 3.6–4.8 $\mu$m tuning can be achieved with a $\Lambda$=22.6 $\mu$m QPM sample over an angular range of $\theta$=0–21°, and, as discussed above, a tuning range of 3–4.1 $\mu$m was achieved for a $\Lambda$=21.2 $\mu$m sample. FIG. 11 shows the results of DFG in the range of $\lambda_1$=3.0–5.5 $\mu$m, measured in a $\Lambda$=21.2 $\mu$m sample using a Ti:$Al_2O_3$ laser. Incidence angles were varied from $\theta$=0° at 3.0 $\mu$m to a maximum of 54° at 4.2 $\mu$m. For purposes of comparison, a theoretical DFG power vs. wavelength dependence is also plotted. The calculation represents the wavelength dependence suggested in various references, and includes variation of $d_{33}$ and focusing parameter h with $\lambda_1$ (in contrast with the alternative preferred embodiment discussed above where constant $d_{33}$ and h were assumed). It will be noted that the smaller than predicted DFG power at longer wavelengths apparently is a consequence of several factors not accounted for in the calculation: increasing facet reflectivity and decreasing acceptance angles for large $\theta$ values, and $LiNbO_3$ absorption for $\lambda_1$>4.5 $\mu$m. The theoretical values therefore represent the best case, or the power generated in absence of absorption and for $\theta$=0 at all $\lambda_1$. As shown in FIG. 11, a maximum power of 0.45 mW was measured at 3.0 $\mu$m with 4.0 W of Nd:YAG power and 0.42 W of Ti:$Al_2O_3$ power incident on the bulk crystal 28.

In summary, 3.0–4.1 $\mu$m tunability and 0.5 mW cw maximum output power were generated using the optical circuit of FIG. 1 using DFG processing in 6-mm-long periodically poled bulk $LiNbO_3$ crystal. It will be appreciated that this represents significant improvements in tuning range and power over previous DFG system results and demonstrates a near-theoretical nonlinear conversion efficiency in field-poled $LiNbO_3$. With increased active region length, output powers in the several-milliwatt range should be possible. It will also be appreciated that this approach is well suited for use with high-power cw semiconductor amplifiers and diode-pumped lasers and offers the possibility for a compact, efficient, room-temperature, widely tunable, narrow-band source required in spectroscopic, monitoring, and sensing applications.

In addition, a practical, widely tunable, mid-IR DFG source advantageously can be fabricated using a high power semiconductor laser, a Nd:YAG laser, and bulk field poled QPM-$LiNbO_3$ crystal operated near the degeneracy point. A DFG power of 0.2 mW and a near-theoretical nonlinear conversion efficiency at 4.5 $\mu$m can be obtained with this optical circuit. It should again be noted that QPM $LiNbO_3$ is shown to have an ultra-wide acceptance bandwidth of 0.5 $\mu$m near the 4.2 $\mu$m wavelength degeneracy point. This unique feature, which is absent in conventional birefringently tuned nonlinear materials, advantageously allows simple single knob DFG wavelength tuning. The wide, rotation-free bandwidth is also important for intracavity DFG where $\lambda_2$ is fixed and crystal rotation is undesirable because of its effects on the cavity alignment and laser spectrum. The optical circuit illustrated in FIG. 7 and the results obtained using this optical circuit provide a practical, narrowband, tunable mid-IR source for gas sensing and other applications.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for generating a laser beam having a desired wavelength from a first laser source having a first output which is adjustable in wavelength and a second laser source producing a second output of fixed wavelength in a system including a periodically poled non-linear bulk crystal receiving the first and second outputs at one face of the crystal, the method comprising the steps of:

adjusting the wavelength of the first output;

simultaneously rotating the bulk crystal by a selected angle; and combining the first and second outputs to thereby generate a resultant output of the desired wavelength.

2. The method as recited in claim 1, wherein the combining step comprises subtracting the first output from the second output to thereby generate the resultant output having a wavelength less than that of either the first or the second outputs.

3. The method as recited in claim 2, wherein the adjusting and rotating steps are performed so as to satisfy the conditions:

(1) $1/\lambda_3=1/\lambda_1-1/\lambda_2$; and (2) $\Lambda_{eff}=n_3/\lambda_3-n_1/\lambda_1+n_2/\lambda_2$ where $\lambda_3$, $\lambda_1$, $\lambda_2$ are wavelengths of said resultant, said first and second outputs, respectively, $\Lambda$ is the period of the gratings of the bulk crystal and $n_3$, $n_1$, and $n_2$ denote the index of refraction of the crystal for the wavelengths $\lambda_3$, $\lambda_1$, $\lambda_2$, respectively.

4. The method as recited in claim 1, wherein the combining step comprises summing the first output and the second output to thereby generate the resultant output having a wavelength greater than that of said first and said second outputs.

5. The method as recited in claim 4, wherein the adjusting and rotating steps are performed so as to satisfy the conditions:

(1) $1/\lambda_3=1/\lambda_1+1/\lambda_2$; and (2) $\Lambda_{eff}=n_3/\lambda_3-[n_1/\lambda_1+n_2\lambda_2]$ where $\lambda_3$, $\lambda_1$, $\lambda_2$ are wavelengths of said resultant, said first and said second outputs, respectively, $\Lambda$ is the period of the grating of the crystal and $n_3$, $n_1$, and $n_2$ denote the index of refraction of the bulk crystal for the wavelengths $\lambda_3$, $\lambda_{1,2}$, respectively.

6. A combination generating a resultant laser beam of desired wavelength comprising:

a first laser device generating a first beam of adjustable wavelength;

a second laser device generating a second beam of fixed wavelength;

a periodically poled non-linear crystal receiving the first and second beams at one face of said crystal;

a rotating mechanism for rotating said crystal so as control the angle of incidence of said first and second beams with respect to said face of said crystal so as to permit said first and said second beams to combine and thereby form the resultant beam.

7. The combination as recited in claim 6, wherein said rotating mechanism comprises a turntable.

8. A method for generating a laser beam having a desired wavelength range from a first laser source having a first output which is adjustable in wavelength and a second laser source producing a second output of fixed wavelength in a system including a periodically poled non-linear bulk crystal receiving the first and second outputs at one face of the crystal, the method comprising the steps of:

providing a periodically poled non-linear bulk crystal have a domain period substantially equal to but less than its respective degeneracy point;

selecting a fixed wavelength of said first output; and combining said fixed output and the second output to thereby generate a resultant output in the desired wavelength range.

9. The method as recited in claim 8, wherein the combining step comprises subtracting the first output from the second output to thereby generate the resultant output having a wavelength less than that of either the first or the second outputs.

10. A combination generating a resultant laser beam in a desired wavelength range, comprising:

a first laser device generating a first beam of adjustable wavelength;

a second laser device generating a second beam of fixed wavelength; and a periodically poled non-linear crystal receiving the first and second beams at one face of said crystal, wherein the period of the crystal is substantially equal to but less than the degeneracy point for said crystal, said crystal combining said first and said second beams to thereby form the resultant beam in the desired frequency range.

11. A laser system generating a resultant laser beam in a desired wavelength range using difference-frequency generation (DFG) in a quasi-phase matched (QPM) $LiNbO_3$ crystal carried out using a Nd:YAG laser and a high power semiconductor laser, wherein said crystal is oriented at the (QPM) degeneracy point to thereby permit generation of a 0.5 $\mu$m acceptance bandwidth.

* * * * *